(12) United States Patent
Bradley

(10) Patent No.: US 6,978,575 B1
(45) Date of Patent: Dec. 27, 2005

(54) WATER LEVEL REGULATING PLANT CONTAINER

(76) Inventor: Treg Bradley, 215 E. Catalina, Phoenix, AZ (US) 85012

( * ) Notice: Subject to any disclaimer, the term of this patent is extended or adjusted under 35 U.S.C. 154(b) by 0 days.

(21) Appl. No.: 10/863,698

(22) Filed: Jun. 8, 2004

(51) Int. Cl.$^7$ .............................................. A01G 9/02
(52) U.S. Cl. ...................................................... 47/66.1
(58) Field of Search .............................. 47/1.01 R, 18, 47/60, 61, 64, 62 C, 62 R, 62 E, 65.5, 66.2, 47/66.6, 66.7, 66.71, 71, 73, 79; 296/93, 296/201

(56) References Cited

U.S. PATENT DOCUMENTS

| | | | | |
|---|---|---|---|---|
| 869,523 A | * | 10/1907 | Schmidt | 47/66.6 |
| 1,513,829 A | * | 11/1924 | Klow | 47/66.1 |
| 2,058,934 A | * | 10/1936 | Yohe | 47/79 |
| 2,584,219 A | * | 2/1952 | Murrell | 312/207 |
| 3,451,162 A | * | 6/1969 | Rasmussen | 47/62 E |
| 4,250,665 A | * | 2/1981 | English et al. | 47/81 |
| 5,430,973 A | * | 7/1995 | Luo | 47/66.6 |
| 6,311,430 B1 | * | 11/2001 | Ma | 47/61 |
| 2003/0145519 A1 | * | 8/2003 | Winsbury | 47/62 R |

FOREIGN PATENT DOCUMENTS

| | | | | | |
|---|---|---|---|---|---|
| FR | 2564691 A1 | * | 11/1985 | | A01G 9/02 |
| JP | 408280266 A | * | 10/1996 | | A01G 9/04 |
| JP | 411332389 A | * | 12/1999 | | A01G 9/02 |

* cited by examiner

Primary Examiner—Francis T. Palo
(74) Attorney, Agent, or Firm—Parsons & Goltry; Robert A. Parsons; Michael W. Goltry

(57) ABSTRACT

A water regulating plant container including a body having opposed side walls and opposed end walls terminating at a top edge in a rim and at a bottom edge by an inwardly directed flange extending from each opposed side wall. A raised bottom is carried by and coupled to the inwardly directed flanges and defines an underlying channel. The raised bottom has an aperture therethrough with a standing pipe extending upwardly from the raised bottom encircling the aperture. A tray is removably received by the channel under the raised bottom.

18 Claims, 3 Drawing Sheets

WATER LEVEL REGULATING PLANT CONTAINER

FIELD OF THE INVENTION

This invention relates to Plant accessories.

More particularly, the present invention relates to plant containers.

In a further and more specific aspect, the instant invention concerns a container for plants containing support media.

BACKGROUND OF THE INVENTION

Planters, flower pots and other plant containers have been used for many years. These containers are conventionally, simply sidewalls with a bottom holding dirt to support the growth of one or more plants. While effective, these devices have problems and limitations. Problems include maintaining a proper moisture level in the dirt. Moisture levels are typically maintained by adding water to the soil. If the moisture level is kept too high, plant roots can rot and fungus can grow. Too dry and the plant may not grow properly or even wither and die. Maintaining the proper moisture level is maintained using various aids. Included in these specialized devices are indicators which change color with the amount of moisture. Even with various devices, vigilance and some expertise is required.

An additional problem with these plant containers is the limited flexibility of their use. Essentially, they can only be effectively utilized to provide support for growing plants.

It would be highly advantageous, therefore, to remedy the foregoing and other deficiencies inherent in the prior art.

Accordingly, it is an object of the present invention to provide a new and improved plant container.

SUMMARY OF THE INVENTION

Briefly, to achieve the desired objects and advantages of the instant invention in accordance with a preferred embodiment thereof, provided is a water regulating plant container including a body having opposed side walls and opposed end walls terminating at a top edge in a rim and coupled to a raised bottom at a bottom edge. The raised bottom has a standing pipe extending upward therefrom and defining an outlet therethrough. The raised bottom also defines a channel underlying the raised bottom and aligned with a slot formed in at least one of the opposing end walls. The side walls, end walls and raised bottom define an interior volume. A tray is removably received by the channel and underlying the outlet.

In a specific aspect of the present invention the opposed side walls and opposed end walls terminating at a top edge in a rim and at a bottom edge by an inwardly directed flange extending from each opposed side wall. The raised bottom is carried by and coupled to the inwardly directed flanges. Additionally, the raised bottom includes a horizontal plate having opposing edges, and a generally perpendicular strip extending from each of the opposing edges, bounding the channel.

In a further embodiment of the present invention, the container includes a stabilizer lid removably coupleable to the rim of the body. The lid defines an opening therein accessing the interior volume. The lid includes a stabilizing receptacle coupled to the lid underlying the opening and carried within the interior volume for receiving and stabilizing objects passing through the opening.

BRIEF DESCRIPTION OF THE DRAWINGS

Specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
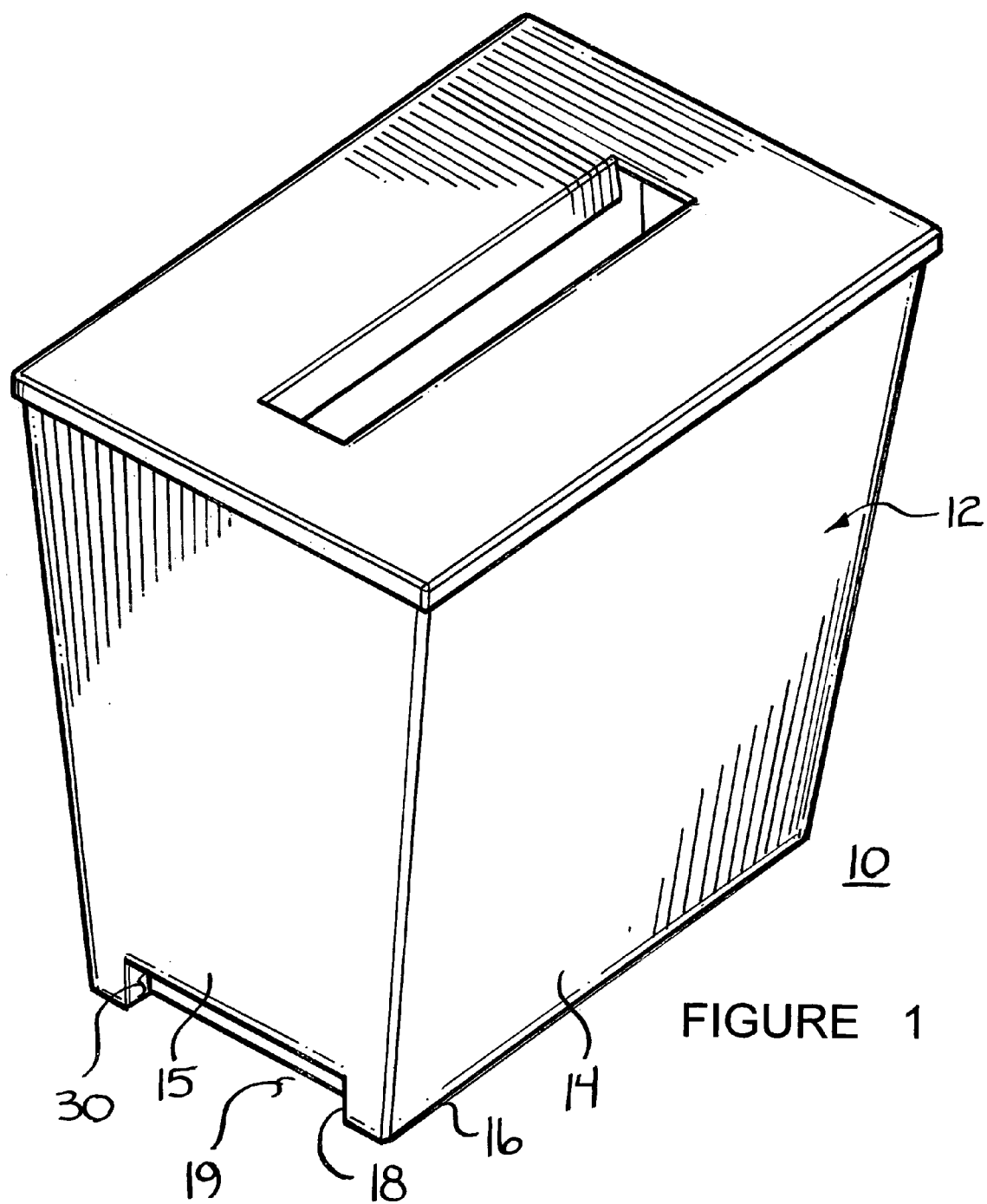
FIG. 1 is a perspective view of a plant container according to the present invention.
Figure 2:
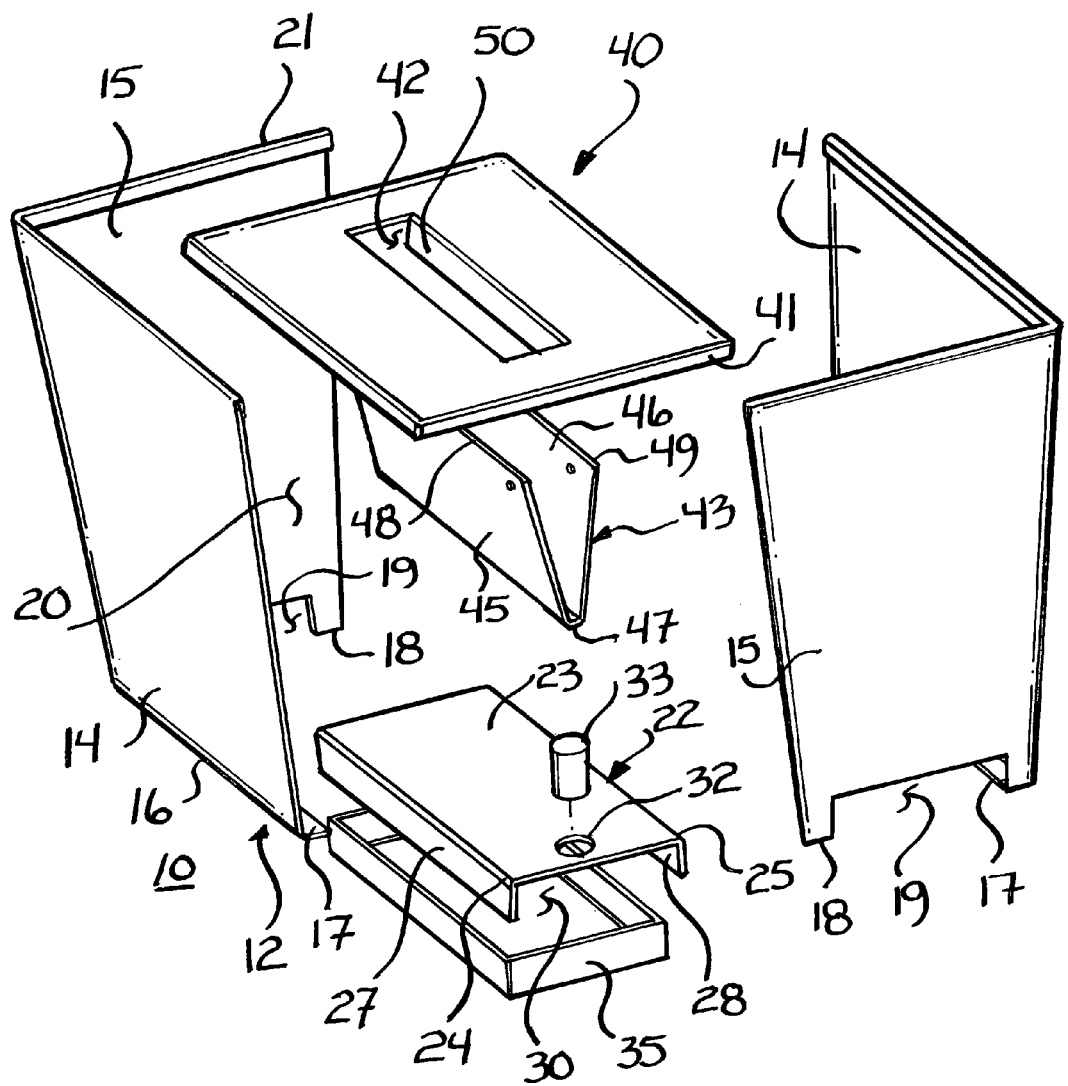
FIG. 2 is a is an exploded perspective view of the container of FIG. 1.

Turning now to the drawings in which like reference characters indicate corresponding elements throughout the several views, attention is first directed to FIGS. 1 and 2 which illustrate a container generally designated 10. Container 10 includes a body 12 having opposed side walls 14, and opposed end walls 15 coupling side walls 14. Side walls 14 terminate at a bottom edge 16 with an inwardly directed flange 17. End walls 15 terminate at a bottom edge 18 with a generally centrally located slot 19. It will be understood that either or both of end walls 15 can have a slot formed therein. Side walls 14 and end walls 15 define an interior volume 20 for containing various types of growth or support media and terminate at a top edge in a rim 21.

Referring specifically to FIG. 2, a raised bottom 22 is carried by and coupled to inwardly directed flanges 17. In this embodiment, raised bottom 22 includes a horizontal plate 23 having opposing edges 24 and 25, and generally perpendicular strips 27 and 28 extending from opposing edges 24 and 25, respectively. Raised bottom 22 defines a channel 30 underlying plate 23 and bounded on the sides by strips 27 and 28. The joint between flanges 17 and strips 27 and 28 can be formed in any manner, such as welding, soldering, adhering, tacking, and the like, so as to form a substantially water proof seal. In a like manner, the ends of strips 27 and 28 and the ends of plate 23 are coupled to end walls 15 at bottom edge 18 defining slot 19. Thus, interior volume 20 is further defined by raised bottom 22. An aperture 32 is formed through plate 23 of raised bottom 22 allowing fluid communication between interior volume 20 and channel 30. Aperture 32 is effectively elevated by the use of a standing pipe 33 extending upwardly from raised bottom 22 encircling aperture 32. A tray 35 is removably received by channel 30 underlying aperture 32. Tray 35 is easily inserted through one of slots 19 and substantially fills channel 30.

In operation, growing media is placed within container 10 filling or partially filling interior volume 20. The growing media supports a plant, and holds its root system. By adding water, with or without plant nutrients, the plant is provided sustenance. Too much water can damage a plant, too little, and growth can be adversely effected. In the present invention, the level of water is self regulated by the height of standing pipe 33. Water is added to container 10 until it reaches the level of the top of standing pipe 33. When the level is achieved, additional water is drained from interior volume 20 through standing pipe 33 and aperture 32 into tray 35. The height of standing pipe 33 is adjusted so as to provide the optimal water level. Growing media typically wicks up some of the water, and therefore a low level can be maintained. This keeps water off of the roots but provides ample moisture. If excessive water has been added, the extra water flows to tray 35. Tray 35 is then removed from channel 30 through one of slots 19 and the water is discarded.

Figure 3:
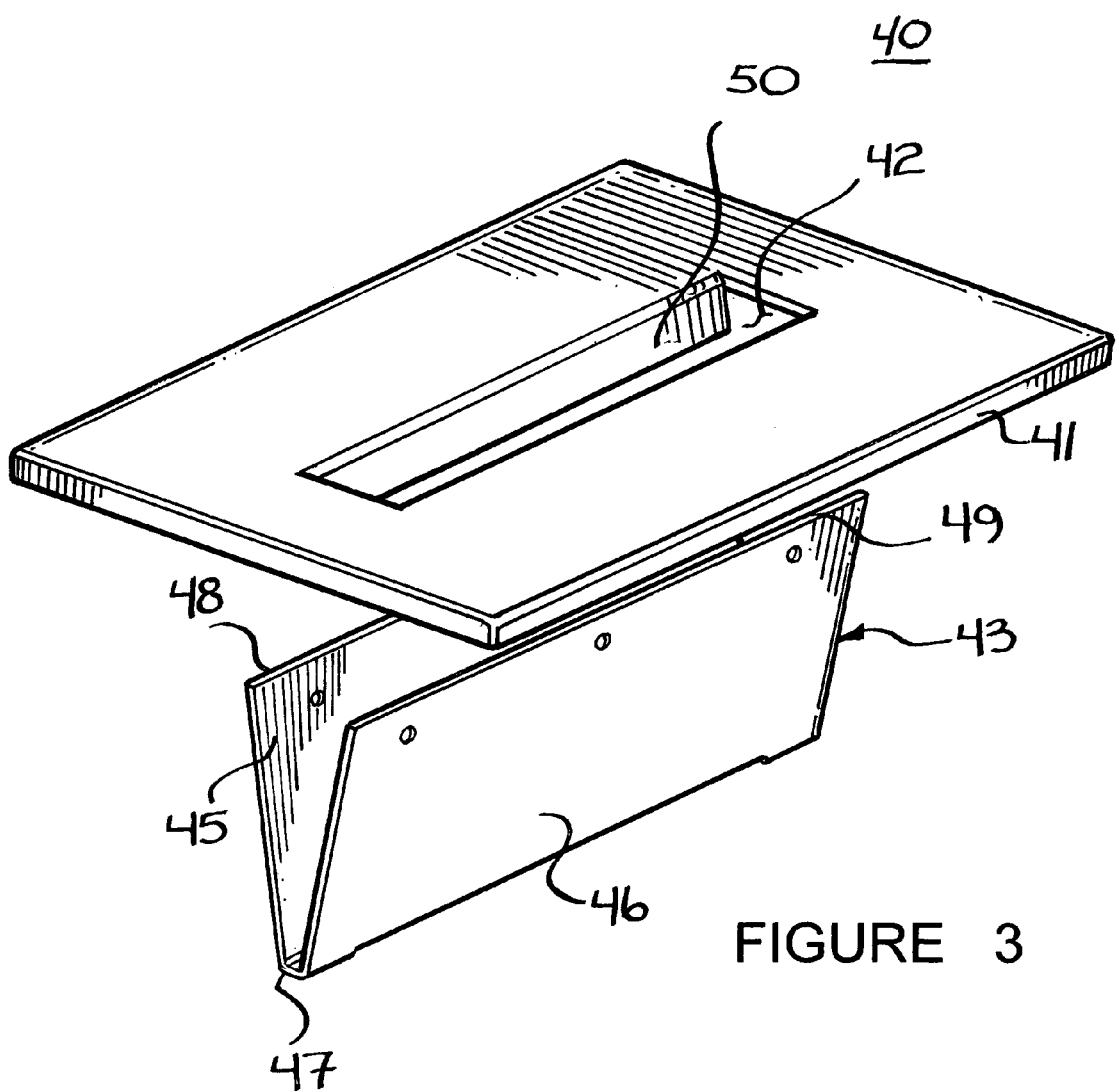
FIG. 3 is an exploded perspective view of the stabilizer unit of FIG. 1.

Still referring to FIGS. 1 and 3, with additional reference to FIG. 4, container 10 further includes a stabilizer lid 40 having an edge 41 formed to engage rim 21. Stabilizer lid 40 is removably couplable to rim 21 of body 12 as desired and for purposes which will be discussed presently. Stabilizer lid 40 defines a central opening 42 therein accessing interior volume 20. In the preferred embodiment, opening 42 is an elongated slot. Lid 40 also includes a stabilizing receptacle 43. Receptacle 43 is coupled to lid 40 underlying opening 42 and carried within interior volume 20 for receiving and stabilizing objects passing through opening 42. Receptacle 43 is substantially V-shaped in cross section with panels 45 and 46 extending from a cross-piece 47 and terminating in edges 48 and 49, respectively. Edges 48 and 49 are coupled to lid 40 on opposing sides of opening 42, preferably coupled to flanges 50 extending downwardly therefrom. The ends of receptacle 43 are open, allowing communication with interior volume 20.

With stabilizer lid 40 in position on body 12, container 10 can be employed as a flower arranging vase or the like. Flowers or other elongate objects can be inserted through opening 42 and maintained in position by receptacle 43 cooperating with the edges of opening 42. When cut flowers or other plant material is used, water can be added to interior volume 20 to and standing pipe 33 adjusted accordingly.

Container 10 can be fabricated of substantially any material, such as metal, plastic and the like, but is fabricated of stainless steel in the preferred embodiment. The shape of body 12 can also vary as desired, from completely upright side walls and end walls to slightly slanted walls as in the preferred embodiment. Furthermore, body 12 can be square or rectangular, and have additional walls. For example a hexagonal, octagonal, etc. shape can be employed, as long as there is at least one end wall for the formation of a slot to match a channel in the raised bottom.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

What is claimed is:

1. A water regulating plant container comprising:
   a body having opposed side walls and opposed end walls terminating at a top edge in a rim and at a bottom edge by an inwardly directed flange extending from each opposed side wall;
   the side walls and end walls define an interior volume for containing grow media;
   a raised bottom carried by and coupled to the inwardly directed flanges, the raised bottom having an aperture therethrough and defining a channel underlying said raised bottom;
   a standing pipe extending upwardly from the raised bottom encircling the aperture; and
   a tray removably received by the channel underlying the raised bottom.

2. A container as claimed in claim 1 wherein the end walls terminate at a lower edge defining a slot for receiving the tray therethrough.

3. A container as claimed in claim 1 further including a stabilizer lid removably coupleable to the rim of the body, the lid defining an opening therein accessing the interior volume.

4. A container as claimed in claim 3 wherein the lid further includes a stabilizing receptacle coupled to the lid underlying the opening and carried within the interior volume for receiving and stabilizing objects passing through the opening.

5. A container as claimed in claim 1 wherein the standing pipe extends upwardly to a level co-extensive with a desired water level.

6. A container as claimed in claim 1 wherein the raised bottom includes a horizontal plate having opposing edges, and a generally perpendicular strip extending from each of the opposing edges, bounding the channel.

7. A water regulating plant container comprising:
   a body having opposed side walls and opposed end walls terminating at a top edge in a rim and at a bottom edge by an inwardly directed flange extending from each opposed side wall, and a slot defined in a bottom edge of one of the opposed end walls;
   a raised bottom carried by and coupled to the inwardly directed flanges, the raised bottom having a standing pipe extending upward therefrom and defining an outlet therethrough, the raised bottom defining a channel underlying the raised bottom and aligned with the slot formed in the one of the opposing end walls;
   the side walls, end walls and raised bottom define an interior volume; and
   a tray removably received by the channel and underlying the outlet.

8. A container as claimed in claim 7 wherein the other of the opposing end walls terminates at a lower edge defining a slot for receiving the tray therethrough.

9. A container as claimed in claim 7 further including a stabilizer lid removably coupleable to the rim of the body, the lid defining an opening therein accessing the interior volume.

10. A container as claimed in claim 9 wherein the lid further includes a stabilizing receptacle coupled to the lid underlying the opening and carried within the interior volume for receiving and stabilizing objects passing through the opening.

11. A container as claimed in claim 7 wherein the standing pipe extends upwardly to a level co-extensive with a desired water level.

12. A container as claimed in claim 7 wherein the raised bottom includes a horizontal plate having opposing edges, and a generally perpendicular strip extending from each of the opposing edges, bounding the channel.

13. A water regulating plant container comprising:
   a body having opposed side walls and opposed end walls terminating at a top edge in a rim and coupled at a bottom edge to a raised bottom;
   the raised bottom having a standing pipe extending upward therefrom and defining an outlet therethrough, the raised bottom defining a channel underlying the raised bottom and aligned with a slot formed in one of the opposing end walls;
   the side walls, end walls and raised bottom define an interior volume; and
   a tray removably received by the channel and underlying the outlet.

14. A container as claimed in claim 13 wherein the other of the opposing end walls terminates at a lower edge defining a slot for receiving the tray therethrough.

15. A container as claimed in claim 13 further including a stabilizer lid removably coupleable to the rim of the body, the lid defining an opening therein accessing the interior volume.

16. A container as claimed in claim 15 wherein the lid further includes a stabilizing receptacle coupled to the lid underlying the opening and carried within the interior volume for receiving and stabilizing objects passing through the opening.

17. A container as claimed in claim 13 wherein the standing pipe extends upwardly to a level co-extensive with a desired water level.

18. A container as claimed in claim 13 wherein the raised bottom includes a horizontal plate having opposing edges, and a generally perpendicular strip extending from each of the opposing edges, bounding the channel, the strips are coupled to flanges extending inwardly from the bottom edges of the side walls.

* * * * *